United States Patent
Ewart et al.

(10) Patent No.: US 11,078,441 B2
(45) Date of Patent: Aug. 3, 2021

(54) LUBRICANT TREATMENTS FOR FREE-RADICAL POLYMERIZATIONS

(71) Applicant: Dow Global Technologies LLC, Midland, MI (US)

(72) Inventors: Sean W. Ewart, Pearland, TX (US); Sarat Munjal, Lake Jackson, TX (US); Kefu Sun, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 155 days.

(21) Appl. No.: 16/332,579

(22) PCT Filed: Sep. 19, 2017

(86) PCT No.: PCT/US2017/052170
§ 371 (c)(1),
(2) Date: Mar. 12, 2019

(87) PCT Pub. No.: WO2018/063853
PCT Pub. Date: Apr. 5, 2018

(65) Prior Publication Data
US 2020/0277544 A1    Sep. 3, 2020

Related U.S. Application Data

(60) Provisional application No. 62/471,077, filed on Mar. 14, 2017, provisional application No. 62/400,815, filed on Sep. 28, 2016.

(51) Int. Cl.
*C08F 10/02* (2006.01)
*C08F 110/02* (2006.01)
(Continued)

(52) U.S. Cl.
CPC ..... *C10M 175/0025* (2013.01); *C08F 110/02* (2013.01); *C10M 129/16* (2013.01);
(Continued)

(58) Field of Classification Search
CPC ....... C08F 10/02; C08F 110/02; C08F 210/02
See application file for complete search history.

(56) References Cited

U.S. PATENT DOCUMENTS 7,632,900 B1    12/2009    Imfeld et al.
8,871,876 B2    10/2014    Berbee et al.
(Continued)

FOREIGN PATENT DOCUMENTS

JP    58019393 A    2/1983
WO    9955810 A1    11/1999
(Continued)

OTHER PUBLICATIONS

Ehrlich et al., "Fundamentals of Free-Radical Polymerization of Ethylene," Adv. Polymer Science, vol. 7, 1970, 386-448.
(Continued)

*Primary Examiner* — Vu A Nguyen
(74) *Attorney, Agent, or Firm* — Dinsmore & Shohl LLP

(57) ABSTRACT

A process to prepare an ethylene-based polymer, said process comprising polymerizing a mixture comprising ethylene, at a pressure greater than, or equal to, 100 MPa, in the presence of at least one free-radical initiator; and in a reactor system comprising at least one reactor and at least one Hyper-compressor, and wherein at least one oil formulation, optionally comprising one or more lubrication agents, is added to the Hyper-compressor; and wherein at least one of the following steps takes place: A) thermally treating the one or more lubrication agents, in an oxygen-free atmosphere, to achieve a peroxide level ≤10 ppm, based on the weight of the lubrication agent(s), and then adding said agent(s) to the oil formulation, prior to adding the oil formulation to the Hyper-compressor; or B) thermally treating the oil formulation, in an oxygen-free atmosphere, to achieve a peroxide level ≤10 ppm, based on the weight of the oil formulation, (Continued)

prior to adding the oil formulation to the Hyper-compressor;
C) a combination of A and B.

5 Claims, 2 Drawing Sheets

(51) Int. Cl.
| | | |
|---|---|---|
| *C10M 175/00* | (2006.01) | |
| *C10M 129/16* | (2006.01) | |
| *C10M 133/40* | (2006.01) | |
| *C10M 135/36* | (2006.01) | |
| *C10N 40/30* | (2006.01) | |

(52) U.S. Cl.
CPC ........ *C10M 133/40* (2013.01); *C10M 135/36* (2013.01); *C10M 2207/04* (2013.01); *C10M 2215/221* (2013.01); *C10M 2219/108* (2013.01); *C10N 2040/30* (2013.01)

(56) References Cited

U.S. PATENT DOCUMENTS

| | | |
|---|---|---|
| 9,751,964 B2 | 9/2017 | Eddy et al. |
| 10,144,898 B2 | 12/2018 | Gutermuth et al. |
| 2010/0196424 A1* | 8/2010 | Kodali .................. A23L 33/12 424/400 |
| 2015/0157038 A1* | 6/2015 | Ergun .................. A21D 2/165 426/573 |
| 2017/0077984 A1 | 3/2017 | Esmaeilzadeh Najari et al. |
| 2017/0260474 A1 | 9/2017 | Gutermuth et al. |

FOREIGN PATENT DOCUMENTS

| | | | |
|---|---|---|---|
| WO | 2010071669 A1 | 6/2010 | |
| WO | 2011057927 A1 | 5/2011 | |
| WO | 2012057975 A1 | 5/2012 | |
| WO | 2013149698 A1 | 10/2013 | |
| WO | 2015100351 A1 | 7/2015 | |
| WO | 2016077512 A2 | 5/2016 | |
| WO | WO-2016077512 A2 * | 5/2016 | ............... C08F 2/38 |
| WO | 2017004320 A1 | 1/2017 | |

OTHER PUBLICATIONS

Debska-Chwaja, Anna, "Third-Generation Compressor Mineral Oil Lubricants for High-Pressure Polyethylene Compressor Cylinders", Lubrication Engineering, 1998, 12-18.
"Optimum Lubrication Oil in LDPE Process", ip.com, Aug. 19, 2011, IPCOM000209993D.
International Search Report and Written Opinion pertaining to PCT/US2017/052170 dated Mar. 13, 2018.

* cited by examiner

LUBRICANT TREATMENTS FOR FREE-RADICAL POLYMERIZATIONS

REFERENCE TO RELATED APPLICATIONS

The present application claims the benefit of U.S. Provisional Application 62/471,077, filed Mar. 14, 2017, and U.S. Provisional Application 62/400,815, filed Sep. 28, 2016.

BACKGROUND OF THE INVENTION

In high pressure, free-radical polymerizations, compressors are used to pressurize the ethylene, and any comonomer, to the desired reaction pressures, and the pressurization step is often followed by a preheating step, to heat the ethylene up to the desired reaction temperatures. Typically, some form of mineral oil based lubricating oil is added to the cylinders of the compressor, to prevent erosion. It is often found that fouling or plugging can occur in either the compressor's cylinders and/or the preheater, leading to a downtime period to replace cylinders, and/or clean the preheater, which, in turn, leads to decreased production rates. This fouling is caused by undesired ethylene and/or comonomer polymerization in these areas. There is need for new polymerization processes that result in a reduction of such fouling and/or plugging.

Lubricating oils, have been made using a polyalkylene glycol base oil. However, these polyalkylene glycol oils often have their own problems, such as reactions with different comonomers or poor electrical properties. Inhibitors have also been used, as mineral oil additives, to reduce plugging or fouling; however these inhibitors can have solubility issues or may require oxygen to be active. Lubrication oils, inhibitors, and/or polymerization using the same, are disclosed in the following references: 1) IP.com Journal, (2011), 11(9A), 13; 2) Lubrication Engineering, Volume 54, Issue 11, Pages 12-18, 1998; 3) International Publication No. WO 2010071669; 4) International Publication No. WO 2016077512; and 5) International Publication No. WO 2013149698. However, as discussed above, there remains a need for new polymerization processes that result in reduced fouling and/or plugging. These needs have been met by the following invention.

SUMMARY OF INVENTION

A process to prepare an ethylene-based polymer, said process comprising polymerizing a mixture comprising ethylene, at a pressure greater than, or equal to, 100 MPa, in the presence of at least one free-radical initiator; and in a reactor system comprising at least one reactor and at least one Hyper-compressor, and wherein at least one oil formulation, optionally comprising one or more lubrication agents, is added to the Hyper-compressor; and wherein at least one of the following steps takes place:

A) thermally treating the one or more lubrication agents, in an oxygen-free atmosphere, to achieve a peroxide level ≤10 ppm, based on the weight of the lubrication agent(s), and then adding said agent(s) to the oil formulation, prior to adding the oil formulation to the Hyper-compressor; or B) thermally treating the oil formulation, in an oxygen-free atmosphere, to achieve a peroxide level ≤10 ppm, based on the weight of the oil formulation, prior to adding the oil formulation to the Hyper-compressor;

C) a combination of A and B.

Also, a process to reduce the peroxide content in an oil formulation, optionally comprising one or more lubrication agents; said process comprising at least one of the following steps:

A) thermally treating the one or more lubrication agents, in an oxygen-free atmosphere, to achieve a peroxide level ≤10 ppm, based on the weight of the lubrication agent(s), and then adding said agent(s) to the oil formulation; or B) thermally treating the oil formulation, in an oxygen-free atmosphere, to achieve a peroxide level ≤10 ppm, based on the weight of the oil formulation;

C) a combination of A and B.

DETAILED DESCRIPTION

Figure 1:
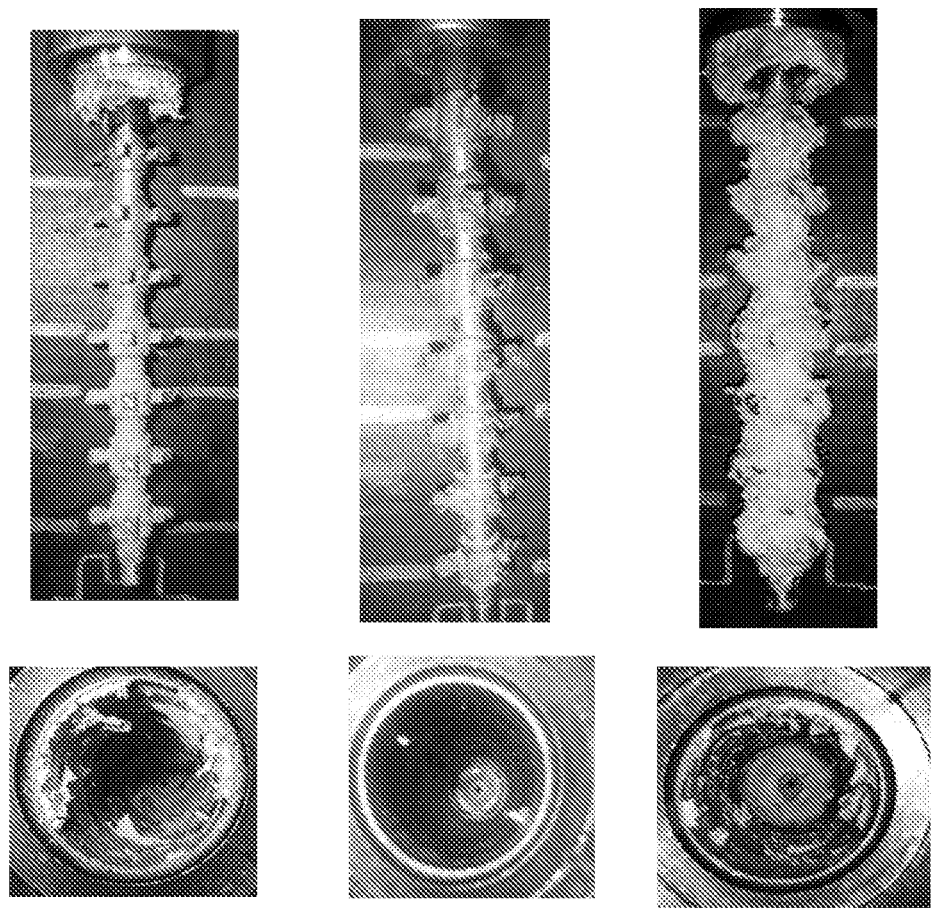
FIG. 1 depicts the polymerization fouling in an agitator and the inside of a reactor tank; which fouling occurred during polymerization run in the presence of a mineral oil containing untreated oleic acid (CE #1, far left), or oleic acid thermally treated under nitrogen (IE #1, middle), or oleic acid thermally treated under air (CE #2, far right).

It has now been discovered that undesired reactor fouling and plugging is enhanced by low levels of peroxides or hydroperoxides in the lubricant oil and its lubrication agents. These peroxides can form free radicals, at the temperatures of the compressor or preheater, leading to the undesired pre-polymerization products and high molecular weight polymer, which, in turn, cause subsequent fouling and plugging of the reactor and other components used in the polymerization process. Inhibitors are often not useful for eliminating this fouling, due to the low concentration of inhibitors relative to the concentration of ethylene in the reactor.

It has been discovered that the thermal treatment of oil formulations and/or lubricating agents, in an oxygen-free environment, at temperatures sufficient to decompose peroxides, can convert the undesired peroxide species into unreactive peroxide cage products, such as ketones or aldehydes. By destroying/converting these peroxides, lubrication oil formulations can be produced, which result in less undesired polymerization and less fouling, as compared to oils that have not been thermally treated or that have been thermally treated in the presence of oxygen.

As discussed above, a process is provided to prepare an ethylene-based polymer, said process comprising polymerizing a mixture comprising ethylene, at a pressure greater than, or equal to, 100 MPa, in the presence of at least one free-radical initiator; and in a reactor system comprising at least one reactor and at least one Hyper-compressor, and wherein at least one oil formulation, optionally comprising one or more lubrication agents, is added to the Hyper-compressor; and wherein at least one of the following steps take place:

A) thermally treating the one or more lubrication agents, in an oxygen-free atmosphere, to achieve a peroxide level ≤10 ppm, based on the weight of the lubrication agent(s), and then adding said agent(s) to the oil formulation, prior to adding the oil formulation to the Hyper-compressor; or B) thermally treating the oil formulation, in an oxygen-free atmosphere, to achieve a peroxide level ≤10 ppm, based on the weight of the oil formulation, prior to adding the oil formulation to the Hyper-compressor;

C) a combination of A and B.

Also, a process to reduce the peroxide content in an oil formulation, optionally comprising one or more lubrication agents; said process comprising at least one of the following steps:

A) thermally treating the one or more lubrication agents, in an oxygen-free atmosphere, to achieve a peroxide level ≤10 ppm, based on the weight of the lubrication agent(s), and then adding said agent(s) to the oil formulation; or B) thermally treating the oil formulation, in an oxygen-free atmosphere, to achieve a peroxide level ≤10 ppm, based on the weight of the oil formulation;

C) a combination of A and B.

An inventive process may comprise two or more embodiments as described herein.

In one embodiment, the at least one reactor is a tubular reactor. In a further embodiment, the tubular reactor comprises ≥2 reaction zones, or ≥3 reaction zones, or ≥4 reaction zones.

In one embodiment, the at least one reactor is an autoclave reactor. In a further embodiment, the autoclave reactor comprises ≥2 reaction zones, or ≥3 reaction zones, or ≥4 reaction zones.

In one embodiment, the reactor system further comprises a Booster compressor and a Primary compressor.

In one embodiment, the reactor system further comprises a Booster compressor, a Primary compressor and a High Pressure Separator.

In one embodiment, the reactor system further comprises a Booster compressor, a Primary compressor, a High Pressure Separator and a Low Pressure Separator.

In one embodiment, the reactor system further comprises a Booster compressor, a Primary compressor, a High Pressure Separator, a Low Pressure Separator, and at least one recycle line to the Hyper-compressor.

In one embodiment, the oil formulation is thermally treated at a temperature from 50° C. to 200° C., or from 60° C. to 180° C., or from 70° C. to 160° C., or from 80° C. to 140° C.

In one embodiment, the oil formulation comprises one or more lubrication agents, and the one or more lubrication agent(s) is/are thermally treated at a temperature from 50° C. to 200° C., or from 50° C. to 200° C., or from 60° C. to 180° C., or from 70° C. to 160° C., or from 80° C. to 140° C., before adding such agents to the oil formulation.

In one embodiment, the oil formulation is thermally treated from 1 hour to 24 hours, or from 2 hours to 24 hours, or from 4 hours to 24 hours.

In one embodiment, the one or more lubrication agents is/are thermally treated from 1 hour to 24 hours, or from 2 hours to 24 hours, or from 4 hours to 24 hours.

In one embodiment, the oil formulation is thermally treated over a catalyst complex, and further a copper complex, and further a copper (II) complex.

In one embodiment, the oil formulation comprises one or more lubrication agents, and the one or more lubrication agents is/are thermally treated over a catalyst complex, and further a copper complex, and further a copper (II) complex, before adding said agent(s) to the oil formulation.

In one embodiment, the peroxide level is reduced to <5 ppm, further <2 ppm, and further <1 ppm, based on the weight of the oil formulation.

In one embodiment, the peroxide level is reduced to <5 ppm, further <2 ppm, and further <1 ppm, based on the weight of the lubrication agent(s).

In one embodiment, the oxygen-free atmosphere is created by at least bubbling an inert gas through the oil formulation.

In one embodiment, the oxygen-free atmosphere is created by at least bubbling an inert gas through the lubrication agent(s).

In one embodiment, the oxygen-free atmosphere is created by at least bubbling an inert gas through the oil formulation and/or by at least bubbling an inert gas through the lubrication agent(s).

In one embodiment, the oxygen-free atmosphere is created by at least bubbling nitrogen gas through the oil formulation.

In one embodiment, the oxygen-free atmosphere is created by at least bubbling nitrogen gas through the lubrication agent(s).

In one embodiment, the oxygen-free atmosphere is created by at least bubbling nitrogen gas through the oil formulation and/or by at least bubbling nitrogen gas through the lubrication agent(s).

In one embodiment, the oil formulation further comprises at least one compound selected from the following compounds i) through iv):

(Compound 1)

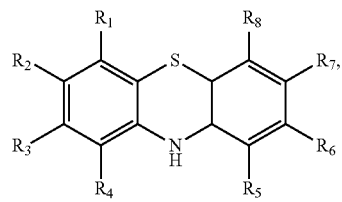

i)

wherein, for Compound 1, R1, R2, R3, R4, R5, R6, R7 and R8 are each independently selected from H, an alkyl, or an alkoxy; and further from H or alkyl (for example, a C1-C5 alkyl), and further H;

(Compound 2)

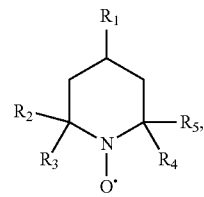

ii)

wherein, for Compound 2, R1 is selected from OH of OR, where R is alkyl (for example, a C1-C5 alkyl), and further R1 is OH; R2, R3, R4 and R5 are each independently selected from H, an alkyl, or an alkoxy, and further from H or alkyl, and further alkyl, and further a C1-C5 alkyl;

(Compound 3)

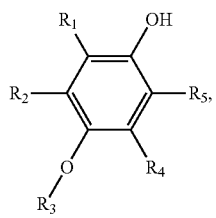

iii)

wherein, for Compound 3, R1, R2, R4 and R5 are each independently selected from H, an alkyl, or an alkoxy, further from H or alkyl, further H; and R3 is selected from H or an alkyl, further alkyl, and further a C1-C5 alkyl; or iv) a combination of two or more of Compounds 1 through 3.

As used herein $R_1$=R1, $R_2$=R2, $R_3$=R3, and so forth.

In one embodiment, the at least one compound is present in an amount from 5 to 60,000 ppm, further from 5 to 50,000 ppm, further from 5 to 40,000 ppm, further from 5 to 30,000 ppm, further from 5 to 20,000 ppm, based on the weight of the oil formulation.

In one embodiment, the at least one compound is present in an amount from 5 to 10,000 ppm, further from 5 to 5,000 ppm, further from 5 to 2,000 ppm, further from 5 to 1,000 ppm, based on the weight of the oil formulation.

In one embodiment, the at least one compound is present in an amount from 5 to 700 ppm, further from 5 to 500 ppm, further from 5 to 200 ppm, further from 5 to 100 ppm, based on the weight of the oil formulation.

In one embodiment, the compound is selected from the following compounds a) through d):

a)

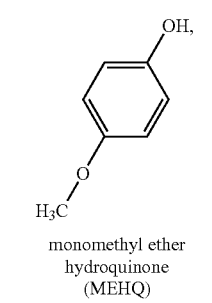

monomethyl ether hydroquinone (MEHQ)

b)

Phenothiazine (PTZ)

c)

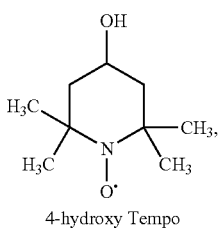

4-hydroxy Tempo or d) a combination thereof.

In one embodiment, the oil formulation comprises ≥70.0 wt %, or ≥75.0 wt %, or ≥80.0 wt %, or ≥85.0 wt %, or ≥90.0 wt %, or ≥95.0 wt %, or ≥98.0 wt %, or ≥99.0 wt % of oil, based on the weight of the oil formulation.

In one embodiment, the discharge pressure at the Hyper-compressor is from 100 MPa to 400 MPa, or from 200 MPa to 400 MPa.

In one embodiment, the oil formulation is injected at one or more injection points into the Hyper-compressor.

In one embodiment, the oil is a mineral oil. In a further embodiment, the oil has a kinematic viscosity, at 40° C., from 50 to 200 mm$^2$/s.

In one embodiment, the Hyper-compressor comprises a reciprocation device and/or a rotational device. In a further embodiment, the oil formulation is continually injected into the reciprocation device and/or the rotational device. In a further embodiment, the oil formulation is injected at a rate of 5 to 100 lbs/hr, or at a rate of 10 to 80 lbs/hr, or from 20 to 60 lbs/hr.

In one embodiment, the pressure in the reactor is greater than, or equal to, 110 MPa, or greater than, or equal to, 120 MPa, or greater than, or equal to, 130 MPa, or greater than, or equal to, 140 MPa, or greater than, or equal to, 150 MPa.

In one embodiment, the ethylene-based polymer is an ethylene homopolymer, and further a LDPE.

In one embodiment, the ethylene-based polymer is an ethylene-based copolymer. In a further embodiment, the comonomer is selected from acrylic acid, ethylene acrylate, CO, acrylate, or methacrylate.

In one embodiment, the ethylene-based copolymer comprises, in the polymerized form, from 1 to 30 weight percent comonomer, further from 3 to 28 weight percent comonomer, and further from 5 to 25 weight percent comonomer, based on the weight of the copolymer. In a further embodiment, the comonomer is selected from acrylic acid, ethylene acrylate, CO, acrylate, or methacrylate.

In one embodiment, the comonomer is an alkylacrylate. Suitable alkylacrylates include methyl, ethyl, propyl, butyl acrylates.

In one embodiment, the comonomer is an alkylmethacrylate. Suitable alkylmeth-acrylates include methyl, ethyl, propyl, butyl methacrylates.

In one embodiment the comonomer is carbon dioxide.

In one embodiment, the reactor comprises at least two reaction zones, a top zone and a subsequent zone. In one embodiment, a comonomer (for example, acrylic acid (AA)) is injected into an ethylene feed, which is then fed directly or indirectly to the top zone of the reactor. In a further embodiment, a CTA is fed to the top zone of the reactor (for example, to narrow MWD of high acid products).

In one embodiment, the temperature in the reactor is greater than, or equal to, 170° C., or greater than, or equal to, 180° C., or greater than, or equal to, 190° C., or greater than, or equal to, 200° C., or greater than, or equal to, 210° C., or greater than, or equal to, 220° C.

In one embodiment, the ethylene-based polymer has a density from 0.900 to 0.955 g/cc, or from 0.900 to 0.950 g/cc, or from 0.900 to 0.945 g/cc, or from 0.900 to 0.940 g/cc (1 cc=1 cm$^3$).

In one embodiment, the ethylene-based polymer has a melt index (I2) from 0.2 to 5000 g/10 min, or from 0.4 to 4000 g/10 min, or from 0.6 to 3000 g/10 min, or from 0.8 to 2000 g/10 min, or from 1.0 to 1000 g/10 min In one embodiment, the ethylene-based polymer has a melt index (I2) from 0.2 to 500 g/10 min, or from 0.2 to 100 g/10 min, or from 0.2 to 50 g/10 min, or from 0.2 to 20 g/10 min, or from 0.2 to 10 g/10 min, or from 0.2 to 5.0 g/10 min.

High Pressure Free Radical Polymerization, Process Characteristics

The term "high pressure polymerization process," as used herein, refers to a free radical polymerization process (typically, for the production of an ethylene-based polymer) that is carried out at an elevated pressure, typically at least 100 MPa (for example, 100 MPa to 500 MPa) and an elevated temperature (for example, 100° C. to 400° C.).

There are two main reactor types to produce, by a high pressure, free radical polymerization process, namely the autoclave reactor and the tubular reactor.

Initiators

The process of the present invention is a free radical polymerization process. Free radical initiators that are generally used, include organic peroxides, such as peresters, perketals, peroxy ketones, percarbonates and cyclic multifunctional peroxides. These organic peroxide initiators are used in conventional amounts, typically from 0.005 to 0.2 weight percent, based on the weight of polymerizable monomers. Other suitable initiators include azodicarboxylic esters, azodicarboxylic dinitriles and 1,1,2,2-tetramethylethane derivatives, and other components, capable of forming free radicals in the desired operating temperature range. Peroxides are typically injected as diluted solutions in a suitable solvent, for example, in a hydrocarbon solvent. In typical high pressure reactors, the initiator is added after the Hyper-compressor and preheater zones to initiate the polymerization.

Chain Transfer Agents (CTA)

Chain transfer agents or telogens are used to help control the molecular weight in a polymerization process. Chain transfer involves the termination of growing polymer chains, thus limiting the ultimate molecular weight of the polymer material. Chain transfer agents are typically hydrogen atom donors that will react with a growing polymer chain, and stop the polymerization reaction of the chain, and initiate the growth of a new polymer chain. These agents can be of many different types, from saturated hydrocarbons, or unsaturated hydrocarbons, to aldehydes, ketones or alcohols. The concentration of the selected chain transfer agent, can be used to help control the molecular weight, for example, the number average molecular weight, Mn, or the melt flow index (MFI or $I_2$) of a polymer.

Suitable chain transfer agents include, but are not limited to, aliphatic and olefinic hydrocarbons, such as pentane, hexane, cyclohexane, propene, pentene or hexane; ketones such as acetone, diethyl ketone, methyl ethyl ketone (MEK) or diamyl ketone; aldehydes such as formaldehyde or acetaldehyde, propionaldehyde; and saturated aliphatic aldehyde alcohols such as methanol, ethanol, propanol or butanol. The chain transfer agent may also be a monomeric chain transfer agent. For example, see WO 2012/057975, U.S. 61/579,067 and U.S. 61/664,956. Furthermore the melt-index can be influenced by the build-up and control of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, an ethylene-based polymer has a density from 0.910 to 0.960, more typically from 0.915 to 0.950, and even more typically from 0.920 to 0.940, grams per cubic centimeter (g/cc or g/cm$^3$). In one embodiment, an ethylene-based polymer has a melt index ($I_2$) from 0.2 to 5000 grams per 10 minutes (g/10 min) at 190° C./2.16 kg, further from 0.5 to 2000 grams per 10 minutes (g/10 min) at 190° C./2.16 kg, further from 1.0 to 1000 grams per 10 minutes (g/10 min) at 190° C./2.16 kg. In one embodiment, an ethylene-based polymer has a melt index ($I_2$) from 0.2 to 50 grams per 10 minutes (g/10 min) at 190° C./2.16 kg, further from 0.2 to 20 grams per 10 minutes (g/10 min) at 190° C./2.16 kg, further from 0.2 to 10 grams per 10 minutes (g/10 min) at 190° C./2.16 kg.

In one embodiment, the ethylene-based polymer is an ethylene homopolymer, and further a LDPE.

In one embodiment, the ethylene-based polymer is selected from ethylene acrylic acid (EAA), ethylene methacrylic acid (EMAA), vinyl acetate, ethyl acrylate, or butyl acrylate. Also, optional secondary comonomers include carbon monoxide, silane-containing comonomers, and others. Terpolymers, such as ethylene-AA-MAA terpolymers may also be formed. Other suitable secondary or higher comonomers to be used in the ethylene-based polymers of the present invention include, but are not limited to, ethylenically unsaturated monomers and especially $C_{3-20}$ alpha-olefins, carbon monoxide, vinyl acetate, and $C_{2-6}$ alkyl acrylates. Other suitable secondary or higher comonomers are described in Ehrlich, P.; Mortimer, G. A.; Adv. Polymer Science; Fundamentals of Free-Radical Polymerization of Ethylene; Vol. 7, pp. 386-448 (1970)—see reference 1.

Additives

One or more additives may be added to the ethylene-based polymer prepared by a process, as described herein. Suitable additives include, but are not limited to, stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays; tackifiers; and oil extenders, including paraffinic or napthelenic oils.

Definitions

Unless stated to the contrary, implicit from the context, or customary in the art, all parts and percents are based on weight, and all test methods are current as of the filing date of this disclosure.

The term "oil" is known in the art, and typically refers to viscous liquid with increased viscosity, as compared to that of water at the same temperature and pressure, and which is derived from petroleum. The oil provides lubrication and reduced friction between moving surfaces of rotational and/or reciprocating mechanisms. The term "oil formulation" comprises at least one oil, and may contain one or more additives, for example, one or more lubrication agents. Additives may be added to improve lubricity, flow properties, thermal stability, and/or other properties. Examples of suitable oils include mineral oils.

The term "polymer," as used herein, refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined below. Trace amounts of impurities may be incorporated into and/or within the polymer.

The term "interpolymer," as used herein, refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer," as used herein, refers to a polymer that comprises 50 wt %, or a majority amount, of polymerized ethylene, based on the weight of the polymer, and, optionally, at least one comonomer.

The term "ethylene-based interpolymer," as used herein, refers to an interpolymer that comprises 50 wt %, or a majority amount, of polymerized ethylene, based on the weight of the interpolymer, and at least one comonomer.

The term "ethylene-based copolymer," as used herein, refers to a copolymer that comprises 50 wt %, or a majority amount, of polymerized ethylene, based on the weight of the copolymer, and a comonomer as the only monomer types.

The term "propylene-based polymer," as used herein, refers to a polymer that comprises a majority amount, of polymerized propylene, based on the weight of the polymer, and, optionally, at least one comonomer.

The phrase "high pressure, free-radical polymerization process," as used herein, refers to a free radical initiated polymerization, carried out at an elevated pressure of at least 100 MPa (1000 Bar).

The terms "feed" or "feed stream," as used herein, refer to fresh and/or recycled reactant(s) added to a reaction zone at an inlet to the reaction zone.

The term "reaction zone," as used herein, refers to a reactor zone where polymerization reaction is initiated or reinitiated by the addition of free radicals and/or the decomposition of components into free radicals or components which generate free radicals.

The term "reactor system," as used herein, refers to the components (devices) used to polymerize and isolate a polymer. Such components/devices include, but are not limited to, one or more reactors, a Hyper-compressor, a Primary compressor, and a Booster compressor. A reactor system typically comprises at least one reactor, for example tubular reactor(s), autoclave reactor(s), or any combination thereof.

The term "injection point," as used herein, refers to the inlet location of a device (used in a polymerization process) where a feed stream is added into the device.

The term "pressurizing," as used herein, refers to increasing the pressure of a liquid or feed to a higher pressure level.

The term "compression system," as used herein, refers to a compression device, which increases the pressure of a vapor (for example, ethylene vapor below or above its critical point) to a higher pressure level. Feeding a comonomer could include pressurizing and feeding the reactive comonomer with an ultra high pressure reciprocating plunger pump, directly to a reactor zone and/or to a feed stream to the reaction zone, and/or feeding the comonomer by a combination of pressurizing with a high pressure pump, and further compressing through reciprocating plunger compressors (for example, Hyper-compressor, Primary compressor and/or Booster compressor).

The term "compression," as used herein, refers to increasing the pressure of a vapor (for example, ethylene vapor below or above its critical point) to a higher pressure level.

The Booster compressor (Booster) is a device that compresses, for example, the following: a) the low pressure recycle coming from the LPS (Low pressure Separator), and b) optionally, the recycled compressor packing leaks; each to the pressure level required at the inlet side of the Primary compressor. This compression can take place in one or multiple compression stages, and can be combined with intermediate cooling. The Booster compressor can consist of single or multiple compressor frames, and can be potentially combined with Primary compressor frame(s).

The Primary compressor (Primary) is a device that compresses, for example, the following: a) the fresh incoming ethylene, and/or b) the low pressure recycle coming from the Booster, and/or c) the recycled compressor packing leaks; each to the pressure level required at the inlet side of the Hyper compressor. This compression can take place in one or multiple compression stages, and can be combined with intermediate cooling. The Primary compressor can consist of single or multiple compressor frames, and can be potentially combined with Booster compressor frame(s).

Hyper-compressor (Hyper), or Secondary compressor, is a device that compresses, for example, the following: the ethylene coming from the HPR (High Pressure Recycle) and/or the Primary compressor; each to a pressure level required to feed the reactor at its inlet pressure set point. This compression can take place in one or multiple compression stages, and can be combined with intermediate cooling. The Hyper-compressor typically comprises a plunger reciprocating compressor, and can consist of single or multiple compressor frame(s).

The term "comonomer containing acid and/or ester groups," as used herein, refers to a comonomer comprising a carboxylic acid group and/or an ester group.

The term "oxygen-free atmosphere," as used herein, refers to an atmosphere that contains ≤100 mole ppm, oxygen ($O_2$), based on the total moles of the gasses in the atmosphere. In one embodiment, the atmosphere contains ≤70 mole ppm oxygen, further ≤50 mole ppm oxygen, further ≤20 mole ppm oxygen, further ≤10 mole ppm oxygen, further ≤5 mole ppm oxygen, based on the total moles of the gasses in the atmosphere.

The phrases "thermally treated," "thermal treatment," and similar phrases, as used herein, in reference to the treatment of an oil formulation and/or treatment of one or more lubrication agents, refer to the application of heat to the oil formulation and/or to the one or more lubrication agents. Heat can be applied using electrical devices, and/or using fluid (e.g., water) heat transfer devices, and/or using other means.

The term "lubrication agent," as used herein, refers to a chemical compound, added to a base oil to increase the lubricating properties of the base oil. These agents include acids, such as oleic acid, and esters.

The term "catalyst complex," as used herein, refers to a chemical compound used to increase the rate of peroxide degradation in an oil formulation or in a lubrication agent. The catalyst complex can be used to decrease the temperature required to cause peroxide decomposition. Such catalyst complexes include, but are not limited to, copper containing compounds, for example, Cu(II) compounds, such as dichloro-(1,10-phenanthroline)-copper(II) or copper(II) chloride, each available from Aldrich. Cu(II) compounds containing amines or halides are useful.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

EXPERIMENTAL

A) Materials

The base oil used was HYDROBRITE 550, a commercial mineral oil available from Sonneborn.
One lubrication agent (treated and untreated)—was evaluated: oleic acid.
Propylene gas, purity>99.5%, based on total volume of gas.
Ethylene gas, purity>99.9%, based on total volume of gas.
CO gas—obtained from Praxair, purity=96.5%, based on total volume of gas.

B) Lubrication Agent—Thermal Treatment Under Nitrogen and Under Air.

Thermal treatment under nitrogen was performed on oleic acid. In a "40 ml sealed vial," was added 20 ml of the oleic acid. The oleic acid was then sparged with nitrogen, for five minutes, to ensure no oxygen remained in the liquid. The sealed vial was then placed on a heated shaker, equilibrated at 140° C., for 17 hours, keeping the seal the entire time. The peroxide levels were measured, before, and after, the thermal treatment, and the results are shown in Table 1. The average of two repetitions are reported in Table 1 with a reproduci-bility of better than 10%.

Thermal treatment under air was performed on the oleic acid. In a "40 ml open vial," 20 ml of the oleic acid was added. The unsealed vial was then placed on a heated shaker, equilibrated at 80° C., for two hours, and the contents of the vial was exposed to the air the entire time on the heated shaker. The peroxide levels were measured, before, and after, the thermal treatment, and the results are shown in Table 1. The average of two repetitions are reported in Table 1. As seen in Table 1, sample IE #1 (N2 treatment) resulted in the lowest level of peroxide.

TABLE 1

Peroxide Levels

| Sample # | Description | peroxide level (ppm*) |
|---|---|---|
| CE#1 | oleic acid untreated | 43 |
| IE#1 | oleic acid thermally treated under nitrogen at 140° C. for 17 hours | 6 |
| CE#2 | oleic acid thermally treated under air at 80° C. for 2 hours | 134 |

*Weight ppm, based on weight of total sample.

C) Polymerization

In a 300 ml, high pressure continuous stirred tank reactor (CSTR) ethylene reactor, ethylene was fed at a flow rate of 25 lb/hr, and heated to a temperature of 140° C. using external heating bands. A solution (20 wt %, based on the weight of the solution) of oleic acid (untreated, thermally treated in N2, or thermally treated in air) added to HYDROBRITE 550 mineral oil, was fed to the reactor, to produce a reactor concentration of mineral oil of 800 mass ppm, based on the ethylene added to the reactor, and a reactor concentration of the oleic acid of 200 mass ppm, based on the ethylene added to the reactor. This flow was continued for 18 hours, before the reactor was shut down, opened and inspected for signs of fouling.

It has been discovered that thermally treating the oleic acid under nitrogen, reduces the amount of reactor fouling. FIG. 1 contains pictures of the reactor (both the agitator and reactor body) after the experiment was performed, and the photographs, from left to right, represent the following: a) polymerization run with oleic acid, untreated (CE #1), b) polymerization run with the oleic acid, after thermal treatment under nitrogen (IE #1), and c) polymerization run with the oleic acid, after thermally treated under air (CE #2). It was discovered, as seen in FIG. 1, that the amount of fouling was greatly reduced, when the oleic acid, thermally treated under nitrogen, was used in the polymerization process. A relative ranking can be given on the amount of fouling observed for each of the examples in Table 2, with 5 being the worst fouling and 1 being a clean reactor.

TABLE 2

Relative Fouling

| Polymer-ization # | Description | Relative Fouling Level (1-5) |
|---|---|---|
| CE#1 | oleic acid untreated | 3 |
| IE#1 | oleic acid thermally treated under nitrogen at 140° C. for 17 hours | 1 |
| CE#2 | oleic acid thermally treated under air at 80° C. for 2 hours | 5 |

D) Proposed Polymerization Design

Figure 2:
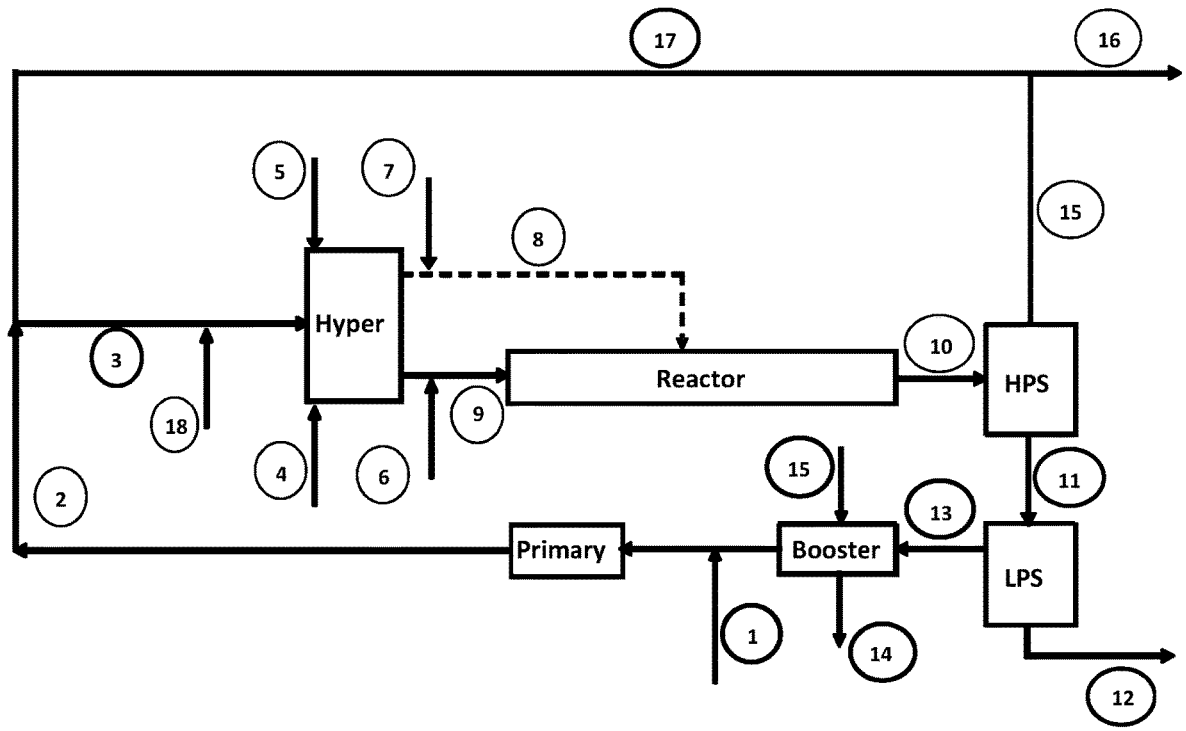
FIG. 2 depicts a schematic of a general flow diagram showing a reactor system for a high pressure polymerization process.

FIG. 2 shows a generalized flow scheme of a high pressure polymerization process with a reactor system containing a tubular reactor, an autoclave reactor, or combination of both tubular and autoclave reactors (Reactor in FIG. 2). A preheater is typically located before the Reactor. Stream (1) represents the fresh ethylene make-up, which is compressed, together with the outlet of the Booster compressor (Booster), by the Primary compressor (Primary), to stream (2). Stream (2) is combined with the high pressure recycle stream (17) from the High Pressure Separator (HPS), and fed to the suction inlet(s) of the Hyper-compressor (Hyper). The Hyper compresses the ethylene feed streams to a level sufficient to feed to the high pressure reactor (Reactor). Although not depicted, the flow scheme could also include a partial combination and/or distribution of the stream (2) and stream (17) over two or more inlets of the Hyper-compressor.

Stream (4), (5) and/or (15, into Booster) depict the CTA system make-up feed. The CTA make-up can be fed through stream (15) in the Booster/Primary compressor area, or through stream (4) and (5). In principle, the CTA make-up can be freely distributed over the main compression streams, and/or fed and/or distributed over the side stream (8) and front stream (9). CTA make-up streams (4) and/or (5) can be fed in the inlet(s), interstage(s), or outlet(s) of the Hyper-compressor and/or inlet(s) of the reaction zones. The CTA system can consist of single and/or multiple components, and can include varying compositions.

Stream (6), (7) and/or (18) depict optional comonomer feed. The comonomer feed can be injected in the Hyper-compressor inlet stream (3) or through stream (6) and (7), and in principle, can be freely distributed over the main compression streams fed to, and/or distributed over, the side stream (8) and/or front stream (9). Comonomer streams (6) and/or (7) can be fed in the inlet(s), interstage(s), or outlet(s) of the Hyper, fed to individual ethylene feed streams to the reactor, and/or fed directly into the reaction zones. The discharge temperature of the Hyper-compressor is typically in the range of 60 to 100° C.

In the Reactor, the polymerization is initiated with the help of a free radical initiation system, injected into, and/or activated in, each reaction zone. The maximum temperature in each reaction zone is controlled at a set point, by regulating the concentration and/or feed amount of initiation system injected in each reaction zone. The reactor system can comprise a tubular and/or autoclave reactor. The Reactor can consist of single and/or multiple tubular and/or autoclave reaction zones.

After finishing the reaction, and having applied multiple cooling steps, the reaction mixture is depressurized and/or cooled in (10), and separated in the high pressure separator (HPS). The HPS separates the reaction mixture into an ethylene rich stream (15, from HPS), containing minor amounts of waxes and/or entrained polymer, and a polymer rich stream (11), which is sent for further separation to the Low Pressure Separator (LPS). Ethylene stream (15) is cooled and cleaned in stream (17). Stream (16) is a purge stream to remove impurities and/or inerts.

The polymer separated in LPS is further processed in (12). The ethylene removed in the LPS is fed to the Booster (see stream 13), where, during the compression, condensables such as solvent, lubrication oil, unconverted comonomer and others are collected and removed through stream (14). The outlet of the Booster is combined with make-up ethylene stream (1), and further compressed by the Primary compressor.

The reactor system shown in FIG. 2 does not exclude different configurations of Booster, Primary and Hyper-compressor line-up to the Reactor. Furthermore make up feed streams like CTA and comonomer can be fed at different locations in the Booster/Primary/Hyper-compressor section and/or to the Reactor directly. Initiator can be injected in an ethylene reactor feed stream, prior to entering a reaction zone, or into a reaction zone directly.

Figure 3:
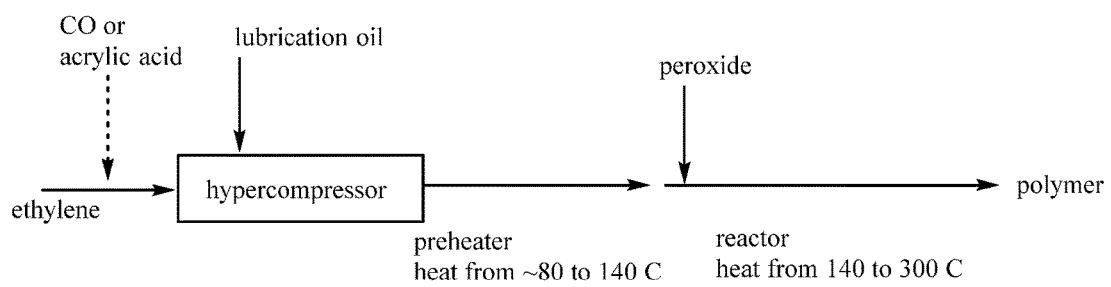
FIG. 3 depicts a simplified schematic of a high pressure polymerization, showing the Hyper-compressor and preheater areas (tubular reactor) which are prone to undesired polymerization and fouling.

FIG. 3 show a schematic of a section of a commercial process, in a tubular reactor, where ethylene is pressurized in a Hyper-compressor to about 30,000 psi, after which, it is fed to a preheater, where it is heated from approx. 80° C. to approx. 140° C. A peroxide initiator is added, to begin the reaction, and the reactor contents (e.g., ethylene, polymer) are further heated to about 300° C. due to the heat of polymerization. After the reaction, the polymer solution is cooled down, the reaction stream is depressurized, and the polymer collected. A lubrication oil is added to the hyper-compressor, in order to prevent wear of the compressor cylinders. In accordance with the discoveries herein, if the compressor oil has a low level of peroxides, through some form of peroxide removal, the amount of premature polymerization and fouling in both the hyper-compressor and the preheater section of the reactor would be reduced (for example, reduced fouling inside the hyper-compressor and inside the reactor). The peroxide removal can be performed through thermal treatment of the oil or thermal treatment of the oil additives, each under an inert, oxygen-free atmosphere (for example, thermally treated, under nitrogen, at 140° C., for 17 hours).

The invention claimed is:

1. A process to prepare an ethylene-based polymer, said process comprising polymerizing a mixture comprising ethylene, at a pressure greater than, or equal to, 100 MPa, in the presence of at least one free-radical initiator; and in a reactor system comprising at least one reactor and at least one Hyper-compressor;

wherein at least one oil formulation, optionally comprising one or more lubrication agents, is added to the Hyper-compressor if a peroxide level of the at least one oil formulation, the at least one lubrication agent, or both the at least one oil formulation and the at least one lubrication agent ≤10 ppm; and wherein at least one of the following steps takes place if the peroxide level >10 ppm before adding the at least one oil formulation to the Hyper-compressor:

A) thermally treating the one or more lubrication agents, in an oxygen-free atmosphere, at from 50° C. to 200° C. for from 1 hour to 24 hours, to achieve a peroxide level ≤10 ppm, based on the weight of the lubrication agent(s), and then adding said agent(s) to the oil formulation, prior to adding the oil formulation to the Hyper-compressor;

B) thermally treating the oil formulation, in an oxygen-free atmosphere, at from 50° C. to 200° C. for from 1 hour to 24 hours, to achieve a peroxide level ≤10 ppm, based on the weight of the oil formulation, prior to adding the oil formulation to the Hyper-compressor; or C) a combination of A and B; and the Hyper-compressor does not contain, when the one or more oil formulation is present, a compound selected from the following compounds i) through iv):

(Compound 1)

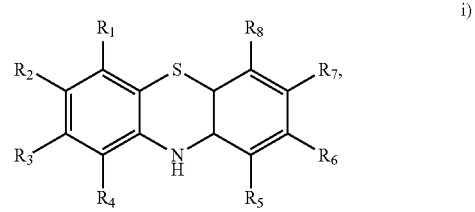

wherein, for Compound 1, R1, R2, R3, R4, R5, R6, R7 and R8 are each independently selected from H, an alkyl, or an alkoxy;

(Compound 2)

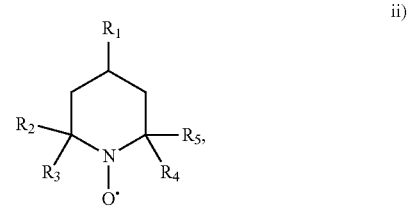

wherein, for Compound 2, R1 is selected from OH or O—R, wherein R is alkyl; and R2, R3, R4 and R5 are each independently selected from H, an alkyl, or an alkoxy;

(Compound 3)

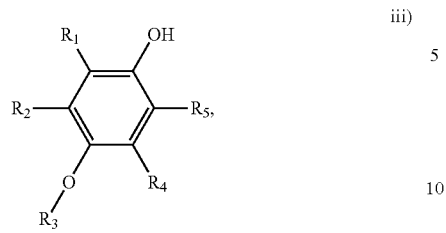

iii)

wherein, for Compound 3, R1, R2, R4 and R5 are each independently selected from H, an alkyl, or an alkoxy; and R3 is selected from H or an alkyl; or iv) a combination of two or more of Compounds 1 through 3.

2. The process of claim 1, wherein the at least one reactor is a tubular reactor.

3. The process of claim 1, wherein the oil formulation comprises greater than, or equal to, 70.0 wt % oil, based on the weight of the oil formulation.

4. The process of claim 1, wherein the oil formulation is injected at one or more injection points into the Hyper-compressor.

5. The process of claim 1, wherein the ethylene-based polymer is an ethylene homopolymer.

* * * * *